United States Patent [19]
Jones

[11] Patent Number: 4,782,875
[45] Date of Patent: Nov. 8, 1988

[54] GROUND-ENGAGING WHEELS FOR VEHICLES

[76] Inventor: Sydney Jones, Cornerstones, Back Lane, Malvern, Worcestershire, England

[21] Appl. No.: 33,043

[22] Filed: Apr. 2, 1987

[30] Foreign Application Priority Data

Apr. 4, 1986 [GB] United Kingdom ............... 8608270

[51] Int. Cl.$^4$ .............................................. B60B 9/00
[52] U.S. Cl. ........................................ 152/80; 152/86
[58] Field of Search ...................... 152/80, 69, 71, 75, 152/86, 82, 17

[56] References Cited

U.S. PATENT DOCUMENTS

| | | | |
|---|---|---|---|
| 591,922 | 10/1897 | Kadel | 152/86 |
| 1,217,190 | 2/1917 | Jutila | 152/80 |
| 1,874,396 | 8/1932 | Weaver | 152/86 |

FOREIGN PATENT DOCUMENTS

| | | |
|---|---|---|
| 2059887 | 4/1981 | United Kingdom . |
| 2109752 | 6/1983 | United Kingdom . |

*Primary Examiner*—James B. Marbert
*Attorney, Agent, or Firm*—Young & Thompson

[57] ABSTRACT

A ground-engaging wheel for a vehicle comprises a hub rotatable about a wheel axis, an inextensible wheel rim encircling and spaced from the hub, and a plurality of similar circumferentially spaced spoke assemblies connected between the hub and wheel rim. Each spoke assembly comprises a rigid inner spoke element connected to the hub and an outer leaf-spring element connected to the rim. The spoke elements are connected together by a pivot to permit relative angular movement between them, and the leaf-springs are pre-stressed so as resiliently to retain the elements in a datum position against the rim. When the wheel is not subjected to an external load, other than the weight of the vehicle to which it is fitted, the spoke elements remain in the datum position and the wheel acts as a conventional rigid wheel. When the wheel is subjected to other external loads, however, such as when it meets a step or other obstacle, the wheel rim can displace relatively to the hub in a manner to smooth the ride over the obstacle and reduce the effort required.

10 Claims, 4 Drawing Sheets

GROUND-ENGAGING WHEELS FOR VEHICLES

BACKGROUND OF THE INVENTION

The invention relates to ground-engaging wheels for vehicles, of the kind comprising a central hub rotatable about a wheel axis, a wheel rim encircling the hub and spaced therefrom, and a plurality of similar circumferentially spaced spoke assemblies connected between the hub and wheel rim, each spoke assembly being resiliently deformable from a datum position so as to permit relative displacement between the hub and rim. Wheels of this kind are described, for example, in my earlier British Patent Specifications Nos. 2,059,887 and 2,109,752.

The wheels disclosed in these earlier specifications are described as preferably having a flexible wheel rim so that the rim deforms under load, such deformation being permitted, and resiliently opposed, by the spoke assemblies. Thus, when the vehicle is subjected to the normal vertically downward load, the lower part of the wheel rim flattens so as to increase the length of rim in close engagement with the ground so as to provide more effective driving engagement between the wheels and the ground, and absorption of unevenness in the ground surface. Furthermore, when the wheel engages an obstacle such as a step in the course of forward motion, the deformation of the wheel rim reduces the upward component of movement of the wheel axis as the wheel rises over the obstacle, thus smoothing the ride over the obstacle and reducing the effort required.

Wheels of this kind find particular application to invalid wheelchairs although they are not, of course, restricted to such use.

It has been found, however, that while the deformation of the wheel rim is extremely useful in enhancing the step-climbing ability of a wheelchair, the deformation of the wheel rim when travelling over substantially smooth ground can give rise to disadvantages. For example, the large tread pattern provided by the deformed wheel is unnecessary for normal indoor use and can lead to unacceptable scuffing damage to the floor surface when steering around a curved path, particularly where the floor surface is carpeting. The present invention therefore sets out to provide a ground engaging wheel of the kind first referred to which retains the step mounting and obstacle mounting advantages of the wheel while avoiding the disadvantages of its use on comparatively smooth ground. This is achieved by constructing the wheel so that while deformation or displacement of the wheel rim relatively to the hub takes place when an obstacle is encountered, no significant displacement or deformation takes place during normal rolling of the wheel on smooth ground.

SUMMARY OF THE INVENTION

According to the invention, therefore, a groundengaging wheel for a vehicle comprises a hub rotatable about a wheel axis, an inextensible wheel rim encircling the hub and spaced therefrom, a plurality of similar circumferentially spaced spoke assemblies connected between the hub and wheel rim, each spoke assembly comprising inner and outer spoke elements connected to the hub and rim respectively and connected together at an angle to one another in such manner as to permit relative angular movement between the spoke elements, and preloaded spring means acting on the spoke elements so as resiliently to retain said elements in a datum position when the wheel is not subjected to an external load.

In use, therefore, the pre-loading of the spring means is such that the spoke assemblies act substantially rigidly between the hub and wheel rim so that, on a smooth surface, the wheel rolls without significant deformation or displacement of the wheel rim relatively to the wheel hub. However, when the wheel rim meets an obstacle the increased load on the spoke assemblies may overcome the pre-loading of the spring means and permit deformation of the spoke assemblies and displacement or deformation of the wheel rim relatively to the hub so that the wheel acts like a conformable wheel in overcoming the obstacle.

The two elements of each spoke assembly may be connected together by a hinge or other pivot device. Alternatively, the required relative angular movement between the spoke elements may be permitted by flexibility of one or other of the elements, or of an element connecting them together.

In each spoke assembly, one of the spoke elements is preferably a substantially rigid element and the other spoke element is a resilient element, such as a leaf-spring. Preferably the resilient element is connected to the wheel rim and constitutes the outer spoke element, although the invention includes within its scope arrangements where the inner spoke element is resilient and the outer spoke element is substantially rigid.

Preferably the substantially rigid spoke element is hingedly connected to the hub or wheel rim, as the case may be. The outer spoke element may also be hingedly connected to the hub or wheel rim. In the case where one of the spoke elements is resilient, however, one end thereof may be rigidly connected to the hub or wheel rim, displacement of the spoke assembly being permitted by resilient flexing of the resilient spoke element.

The spring means may act on only one of the two spoke elements of each spoke assembly; preferably the outer spoke element. In the case where the spoke element is resilient, the resilience of the spoke element may itself provide, or contribute to, the spring means.

In a preferred embodiment the outer spoke element is arcuate and, in the datum position, substantially follows the curve of the wheel rim. For example, the element may lie in abutting, mating engagement with the inner surface of the wheel rim over at least the major part of the length of the spoke element, when in the datum position.

The wheel rim may be substantially rigid, in which case deformation of the spoke elements cause the wheel rim to effect translational movement relatively to the hub. Alternatively, however, the wheel rim may have a degree of flexibility in which case the translational movement may be accompanied by, or replaced by, deformation of the wheel rim in the radial direction.

The invention includes within its scope a vehicle having two or more ground engaging wheels of any of the kinds referred to above.

In use of the wheel on a vehicle there may be provided on the wheel a toothed wheel which is rotatable with the hub and fixed in relation thereto, which wheel is normally free of engagement with a latch device on the vehicle body but which latch device is brought into engagement with the toothed wheel when the vehicle wheel meets an obstacle, thereby preventing rotation of the hub relatively to the vehicle body. Alternatively a ratchet device such as a conventional free-wheel mechnism may be used. Engagement of the wheel with the obstacle causes relative displacement, and hence relative rotation, between the rim and hub. However, since the hub is held against rotation by the latch device, the relative rotation appears as rotation of the wheel rim relatively to the vehicle body, and this assists in mounting the obstacle.

DETAILED DESCRIPTION OF THE PREFERRED EMBODIMENTS

Figure 1:
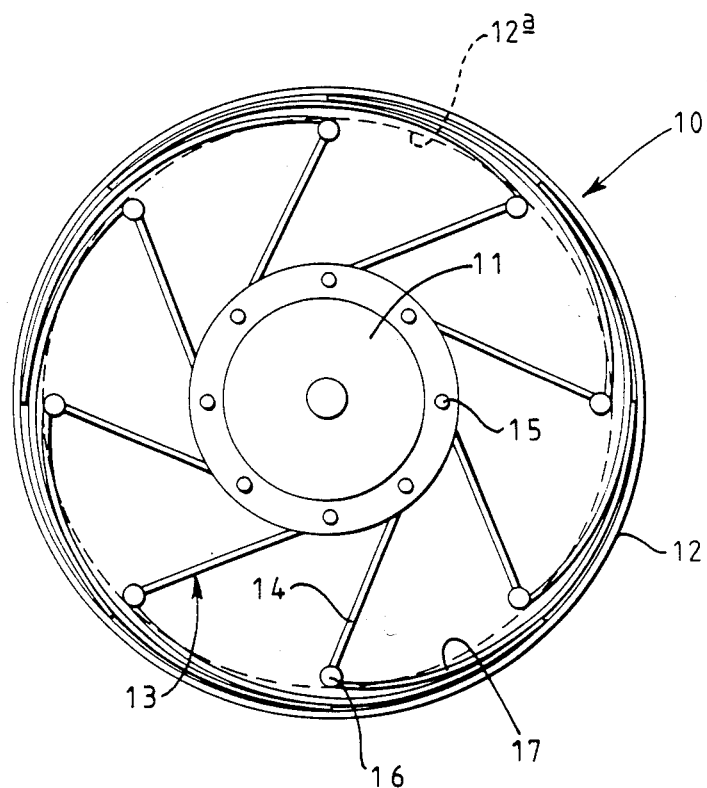
FIG. 1 is a diagrammatic representation of one form of wheel according to the invention.

Referring to FIG. 1, the ground engaging wheel 10 comprises a rotatable hub 11, an inextensible wheel rim 12 encircling the hub and spaced therefrom, and a plurality of similar circumferentially spaced spoke assemblies 13 connected between the hub 11 and wheel rim 12.

Although the wheel rim may be slightly flexible, it is preferably substantially rigid. For example, it may comprise an inwardly facing channel section, the side walls of the channel being indicated in broken lines at 12a in FIG. 1.

Each spoke assembly comprises an inner spoke element 14 hingedly connected to the hub 11 by a pivotal connection 15, the axis of which is parallel to the axis of rotation of the wheel. The spoke element 14 may, for example, comprise a generally triangular structure having two limbs spaced apart at their radially inner ends and pivotally connected to spaced parallel flanges of the hub 11, the outer convergent ends of the limbs being connected together and also connected to one end of a leaf spring 17 which constitutes the aforementioned outer spoke element.

The inner spoke element 14 and outer spoke element 17 are so connected together as to permit relative angular movement between them. For example, they may be hingedly connected together by a pivotal connection 16, as shown in FIG. 1. Alternatively the relative angular movement may be permitted by the flexibility of one or other of the spoke elements, or of an element connecting them together.

Each leaf spring 17 is arcuate, its curvature being substantially equal to the curvature of the wheel rim 12. The end of each leaf spring 17 remote from the pivotal connection 16 is rigidly connected to the wheel rim, for example by riveting, within the channel section thereof.

The inherent resilience of the leaf springs 17 is such as to urge them towards the inner surface of the wheel rim 12. The hinge pins forming the pivotal connections 16 project axially beyond the side edges of the leaf springs 17, and the length of spoke elements 14 is such that when the wheel is not subjected to an external load the pre-stressing of the leaf springs 17 urges the projecting ends of the hinge pins firmly into engagement with the edges of the side walls of the channel-section rim 12, the springs lying substantially within the channel section. This is the datum position of the wheel.

Figure 2:
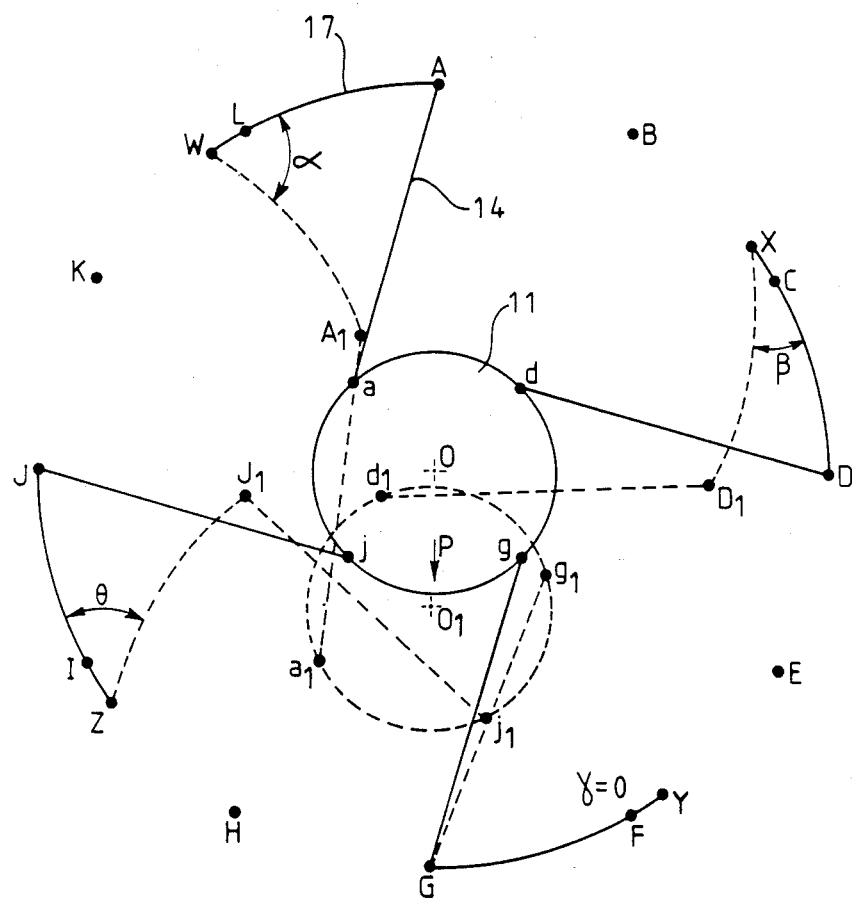
FIG. 2 is a diagrammatic representation of the wheel shown in FIG. 1, showing the movement of the hub and spoke elements under load.

The action of the wheel when heavily loaded is best understood by reference to FIG. 2. For clarity only four spoke assemblies 13 are shown in FIG. 2 but it will be appreciated that any suitable number may be employed. For example twelve similar spoke assemblies may be equally circumferentially spaced around the wheel. The pivotal connections between the rigid spoke elements 14 and the hub 11 are indicated at a, b, c, d, e, etc., and the pivotal connections between the rigid spoke elements 14 and the leaf springs 17 are indicated at A, B, C, D, E, etc. The positions of the spoke elements when the wheel is unloaded are shown in continuous lines and the positions when the wheel is loaded are shown in broken lines. The connections between the leaf springs and the wheel rim 12 are indicated at W, X, Y, Z, etc.

When the hub is loaded with a force in the direction indicated by the arrow F the hub 11 is displaced, relatively to the wheel rim, to the position shown in broken lines. The initial axis of rotation of the wheel is indicated at 0 and the new axis of rotation is indicated at $0_1$. It will be seen that under this load and displacement the leaf springs 17 move away from the wheel rim to a greater or lesser extent depending on their position in relation to the load direction. This movement is resiliently opposed by the resilience of the leaf springs themselves. By comparing the positions a1 etc with the corresponding initial positions a etc, it will be seen that the hub rotates anti-clockwise relatively to the wheel rim. However, as will be described in greater detail below, actual backward rotation of the hub on the vehicle body is prevented by a latch device with the result that the relative rotation between the rim and hub appears as forward rotation of the wheel rim relatively to the vehicle body.

Figure 3:
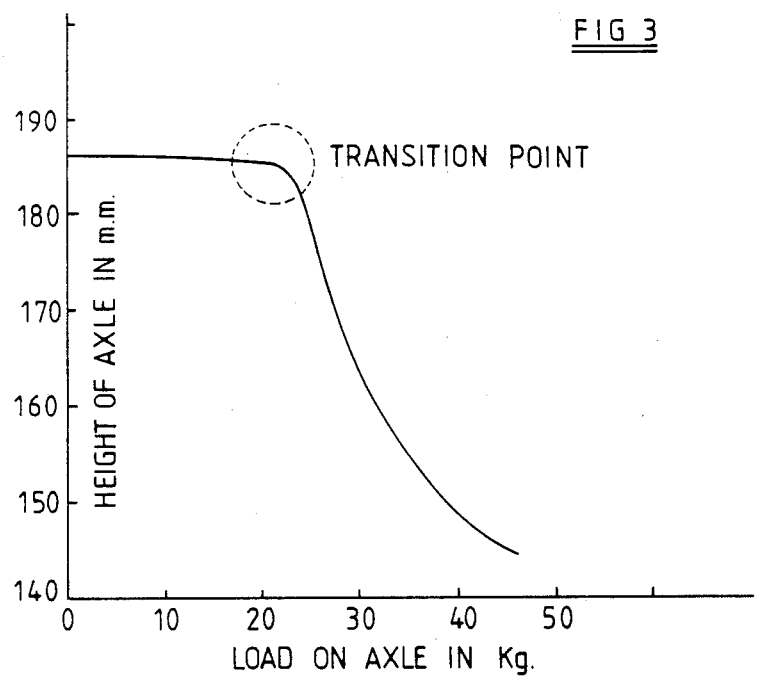
FIG. 3 is a graph showing, for an alternative form of wheel, the axle height in relation to the axle load.

The spring characteristics of the wheel are illustrated graphically in FIG. 3, which shows axle load plotted against axle deflection in the direction of the load. It will be seen that little significant deflection of the hub relatively to the wheel rim occurs up to a transition point since all the leaf springs are held tightly against the rim by their resilience. Beyond the transition point, however, addition load causes the hub to move relatively to the rim in the direction of the load and, as explained in relation to FIG. 2, this results in forward rotation of the wheel rim relatively to the hub.

The functioning of the wheel, when mounted on a vehicle such an as invalid wheelchair, will be considered under three different operating conditions:

a. under light or normal load when running on a smooth surface.

b. under light or normal load when running on a rough surface, and c. when engaging a large obstacle such as a kerb or step. NORMAL OPERATION ON A SMOOTH SURFACE In this situation the only external load acting on the wheel is the downward weight of the wheelchair and occupant acting on the wheel hub. In this situation the load is not sufficient to overcome the pre-loading due to the resilience of the leaf springs 17 and does not therefore pull any of the leaf springs against its spring constraint away from the rim 12. The wheel therefore behaves substantially like a conventional rigid wheel and there is not significant deformation or displacement of the wheel rim 12 relatively to the hub. The tread pattern, i.e. the length of wheel rim engaging the ground surface, is small, and steering drag is eliminated. Thus, where the wheels are mounted on a wheel chair, scuffing of a carpet surface, or other abrasive damage to the ground surface, is avoided. Strain on the leaf springs 17 is zero.

NORMAL OPERATION ON A ROUGH SURFACE

When the vertically loaded wheel rolls over a rough surface momentary dynamic forces act on the wheel which, if the wheel operates about the transition point (as will be explained in relation to FIG. 3), can overcome the pre-loading of the leaf springs 17 forcing these leaves away from the rim 12 and causing displacement of the rim 12 relatively to the hub 11 (or deformation of the rim if it is not rigid). This serves to cushion vibration of the rim and to isolate these vibrations from the vehicle body. Translational displacement of the rim 12 relatively to the hub, as a result of certain of the leaf springs 17 moving away from the wheel rim, results in rotation of the hub 11 intermittently with respect to the rim 12.

OVERCOMING LARGE OBSTACLES

As previously mentioned, there may be provided on the wheel a latch device for preventing rotation of the hub relatively to the vehicle body when an obstruction is met, and one form of suitable latch device is shown diagrammatically in FIG. 7.

The latch device comprises a latch element 20 which co-operates with a toothed wheel 21 which is rotatable with the wheel hub 11. The element 20 is pivotally mounted on the vehicle body by a pivot 22 intermediate its ends. Pivotal movement of the element 20 on the vehicle body is limited by a fixed pin 23 on the vehicle body which engages within an arcuate slot 24 on the latch element. At the opposite end of the latch element to the slot 24 is a pin 25 which may be brought into engagement with the teeth of the wheel 21 by clockwise pivoting movement of the element 20.

Figure 7A:
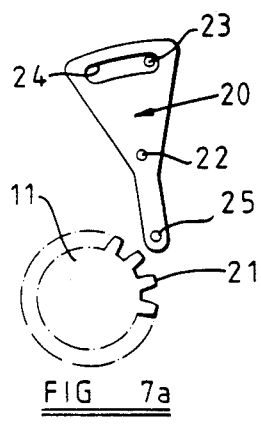
FIGS. 7a and 7b show diagrammatically the operation of a latch device on a wheel according to the invention.
Figure 7B:
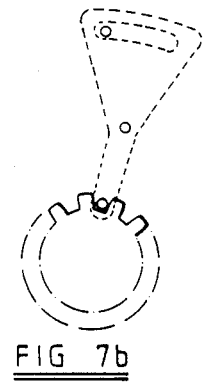

The latch element 20 is normally held out of engagement with the toothed wheel, in the position shown in FIG. 7a, by a spring (not shown). When the vehicle wheel engages a large obstacle, however, the latch element 20 is forced into the position shown in FIG. 7b by pressure from the vehicle body when the wheel is forced backwards.

Figure 4:
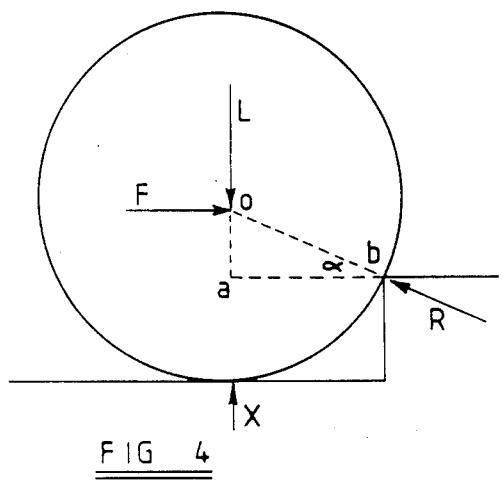
FIG. 4 shows diagrammatically the forces acting on a conventional wheel as it mounts a step.
Figure 5:
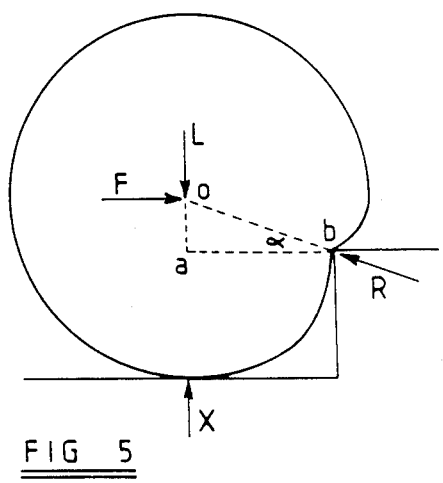
FIG. 5 is a similar view to FIG. 4 showing the forces acting on a conventional wheel with a resilient rim as it mounts a step.
Figure 6:
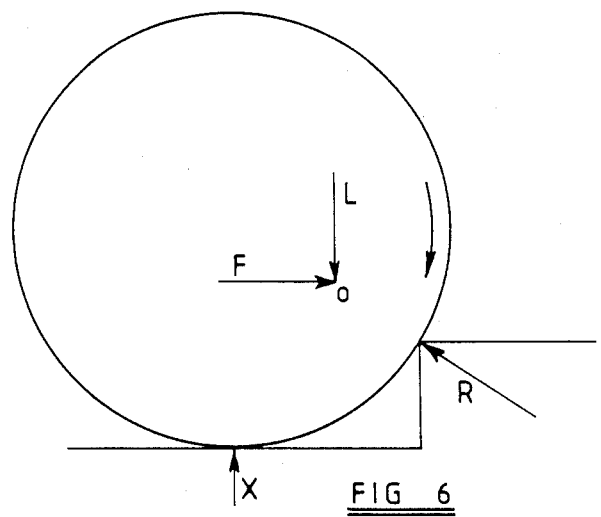
FIG. 6 is also a similar view to FIG. 4, but showing the forces acting on a wheel constructed in accordance with the invention.

FIGS. 4 and 5 show how conventional rigid wheels mount a step, whereas FIG. 6 shows how a wheel in accordance with the invention mounts a similar step.

Referring to FIG. 4, the horizontal driving force acting on the wheel is indicated at F, the vertical load is indicated at L and the reaction force of the step on the wheel rim is indicated at R, the line of action of the reaction force being determined by the triangle of forces. The vertical reaction of the ground on the wheel rim is indicated at X.

At the moment of the wheel climbing the step, the ground reaction force X is zero and the line of action of the reaction force R is determined by the triangle of forces defined by the loads F and L. In the arrangement of FIG. 4, the wheel rim is rigid and the shape of this triangle of forces is therefore unaffected by any elastic deformation of the wheel rim, which remains circular.

FIG. 5 shows a conventional wheel with a resilient rim, for example, a wheel having a pneumatic or other resilient type. Since an elastic material yields in the direction of the applied force the triangle of forces is much the same as that for the rigid wheel of FIG. 4, and hence the ratio F/L remains unaltered.

In the arrangement according to the invention, however, as shown in FIG. 6, the wheel is forced back against the vehicle body on meeting the obstacle. As previously described, this causes the latch element 20 to engage with the toothed wheel 21 on the hub and so prevents the hub from rotating further. Continued pressure against the obstacle causes relative displacement between the hub and rim. This causes the rim to rotate forwardly relatively to the hub, thus assisting the wheel in climbing the obstacle. In other words, the relationship between the forces F, L and R is modified by the torque applied to the rim when the hub latch device is engaged. This torque assists the mounting process and F/L is less than would otherwise be the case.

In a wheel in accordance with the invention, the highly resilient structure of the wheel is preferably damped by means which does not interfere with the steady-state rolling resistance. For example, such damping may be provided by a torsion damper acting on the wheel hub, but it will appreciated that many alternative damping methods may readily be employed.

It should be appreciated that there are many alternative constructions within the scope of the invention to achieve the required result. In the arrangement of FIGS. 1 and 2, the necessary spring constraints on the wheel are provided by the resilience of the outer spoke elements 17 themselves, which are in the form of leaf springs. However, such elements could be comparatively rigid curved elements which are pivotally connected to the wheel rim instead of being riveted to it and in this case the spring restraint could be provided by pre-stressed coil springs acting at each of the pivotal connections which would be at locations W, X, Y and Z indicated in FIG. 2.

Instead of the rigid inner spoke elements 14 being straight as shown in FIGS. 1 and 2, they could be curved with their concave side facing the wheel hub 11 and their convex side facing the rim 12. This facilitates nesting of the spoke elements when the wheel is under load.

Although, as described, the spring constraint is preferably applied to the outer spoke elements 17, it will be appreciated that the constraints could be applied, alternatively or additionally, to the inner spoke elements 14 or could act between the two spoke elements of each assembly. For example, the inner spoke elements 14 could be in the form of leaf springs while the outer spoke elements 17 could be rigid.

I claim:

1. A ground-engaging wheel for a vehicle comprising a hub rotatable about a wheel axis, an inextensible wheel rim encircling the hub and spaced therefrom, a plurality of similar circumferentially spaced two-part spoke assemblies connected between the hub and wheel rim, each spoke assembly comprising a substantially rigid inner element hingedly connected to the hub and a resilient outer element connected to the wheel rim, the rigid inner element extending from the hub to the wheel rim at an angle to the radial direction and being connected to the resilient outer element by a connection which is normally adjacent the wheel rim, the resilient element extending around part of the periphery of the wheel rim and being pre-stressed outwardly so as to maintain said connection in a position adjacent the wheel rim, whereby the rigid inner elements normally act as substantially rigid spokes unless the forces acting on the wheel are sufficient to overcome the outward pre-stressing of at least some of the resilient outer elements, whereupon said resilient elements yield inwardly to permit relative translational and rotational displacement between the wheel rim and hub.

2. A wheel according to claim 1, wherein the connection between each rigid inner element and the associated resilient outer element comprises a pivot device.

3. A wheel according to claim 1, wherein each resilient outer element comprises a leaf-spring.

4. A wheel according to claim 1, wherein one end of each resilient outer element is rigidly connected to the wheel rim, displacement of the spoke assembly being permitted by resilient flexing of the resilient element.

5. A wheel according to claim 1, wherein each resilient outer element is arcuate and substantially follows the curve of the wheel rim.

6. A wheel according to claim 1, wherein each connection between a resilient outer element and a rigid inner element normally lies in abutting engagement with the wheel rim.

7. A wheel according to claim 1, wherein the wheel rim is substantially rigid and resistant to deformation.

8. A wheel according to claim 1, wherein the wheel rim has a degree of flexibility and the translational and rotational displacement between the wheel rim and hub is accompanied by deformation of the wheel rim.

9. A wheel vehicle comprising a vehicle body having rotatably mounted thereon at least one ground-engaging wheel comprising a hub rotatable about a wheel axis, and inextensible wheel rim encircling the hub and spaced therefrom, a plurality of similar circumferentially spaced two-part spoke assemblies connected between the hub and wheel rim, each spoke assembly comprising a substantially rigid inner element hingedly connected to the hub and a resilient outer element connected to the wheel rim, the rigid inner element extending from the hub to the wheel rim at an angle to the radial direction and being connected to the resilient outer element by a connection which is normally adjacent the wheel rim, the resilient element extending around part of the periphery of the wheel rim and being pre-stressed outwardly so as to maintain said connection in a position adjacent the wheel rim, whereby the rigid inner elements normally act as substantially rigid spokes unless the forces acting on the wheel are sufficient to overcome the outward pre-stressing of at least some of the resilient outer elements, whereupon said resilient elements yield inwardly to permit relative translational and rotational displacement between the wheel rim and hub.

10. A vehicle according to claim 9, wherein there is provided on the ground-engaging wheel a toothed wheel which is rotatable with the hub and fixed in relation thereto, and a latch device mounted on the vehicle, the toothed wheel being normally free of engagement with the latch device on the vehicle but which latch device is brought into engagement with the toothed wheel when the vehicle wheel meets an obstacle, thereby preventing rotation of the hub relatively to the vehicle body.

* * * * *